United States Patent [19]

Glize et al.

[11] Patent Number: 4,501,958

[45] Date of Patent: Feb. 26, 1985

[54] VERIFICATION SYSTEM, FOR EXAMPLE FOR PASSING THROUGH A TOLL POINT

[75] Inventors: Jean-Pierre Glize, Labastide D'Armagnac; Michel M. Gaucher, Le Mesnil Saint-Denis, both of France

[73] Assignee: Electronique Marcel Dassault, Paris, France

[21] Appl. No.: 354,506

[22] Filed: Mar. 3, 1982

[30] Foreign Application Priority Data

Mar. 5, 1981 [FR] France ................ 81 04446

[51] Int. Cl.³ .................................. H04Q 1/30
[52] U.S. Cl. .................................. 235/382; 235/384; 235/380
[58] Field of Search ............... 235/380, 381, 382, 379, 235/487, 492, 378, 377, 376, 375; 340/825.31, 825.33, 825.35

[56] References Cited

U.S. PATENT DOCUMENTS

| | | | |
|---|---|---|---|
| 3,906,460 | 9/1975 | Halpern ................ | 340/172.5 |
| 3,934,122 | 1/1976 | Riccitelli .............. | 235/492 |
| 4,001,550 | 1/1977 | Schatz . | |
| 4,013,894 | 3/1977 | Foote et al. ........... | 340/825.34 |
| 4,034,211 | 7/1977 | Horst et al. .......... | 235/454 |
| 4,041,279 | 8/1977 | Foote .................... | 235/454 |
| 4,048,475 | 9/1977 | Yoshida ................ | 235/380 |
| 4,223,830 | 9/1980 | Walton ................. | 235/380 |
| 4,236,068 | 11/1980 | Walton ................ | 235/380 |
| 4,242,663 | 12/1980 | Slobodin . | |
| 4,256,955 | 3/1981 | Giraud et al. ........ | 235/380 |
| 4,277,837 | 7/1981 | Stuckert .............. | 364/900 |
| 4,304,961 | 12/1981 | Campbell, Jr. ...... | 178/22.08 |
| 4,314,097 | 2/1982 | Campbell, Jr. ...... | 178/22.08 |
| 4,353,064 | 10/1982 | Stamm ................. | 340/825.31 |
| 4,367,402 | 1/1983 | Giraud et al. ........ | 235/385 |
| 4,384,288 | 5/1983 | Walton ................. | 340/825.34 |
| 4,388,524 | 6/1983 | Walton ................. | 235/380 |

FOREIGN PATENT DOCUMENTS

| | | | |
|---|---|---|---|
| 8002670 | 8/1981 | France ................ | 235/380 |
| 2057740A | 5/1981 | United Kingdom . | |

OTHER PUBLICATIONS

IBM Tech. Dis. Bul., vol. 23, No. 2, 7/80, p. 673.

Primary Examiner—Gene Z. Rubinson
Assistant Examiner—Robert G. Lev
Attorney, Agent, or Firm—Karl F. Ross; Herbert Dubno

[57] ABSTRACT

A system for verifying an operation in particular one that includes payment, the system comprising at least one terminal (11) and a plurality of portable objects (10) which may be coupled, preferably without contact, to the terminal. The terminal emits repeated interrogation messages suitable for triggering reading of the contents of a shift register (60, 190) in a portable object when said object is coupled thereto, only after a comparator has verified concordance between first validity data from the portable object and check data from the terminal. After processing, the terminal re-writes updated useful data in the register. Re-writing is only authorized after a comparator (240) has verified concordance between second validity data stored in the shift register with check data transmitted by the terminal into a register (220) of the portable object. The check data is produced by the terminal after decoding the validity data contained in the message derived from reading the portable object (10).

7 Claims, 11 Drawing Figures

VERIFICATION SYSTEM, FOR EXAMPLE FOR PASSING THROUGH A TOLL POINT

FIELD OF THE INVENTION

The present invention relates to a verification system in which data stored in a portable object may be verified by associating the object with a terminal which delivers an authorisation or signals "no authorisation", depending on the result of the verification. It is intended, for example, to equip toll stations at which the object, e.g. carried by a person or a vehicle, is presented to a control device which only allows passage is the stored information is representative of sufficient payment and/or a suitable limit date for validity.

BACKGROUND OF THE INVENTION

Access control systems are known which use cards provided with memory in the form of a magnetic track and which are suitable for introduction into a slot of a terminal or access control device within which the data on the magnetic track is read. When the data is recognized as being adequate, access authorization is deliverd, and at the same time new data is written on the magnetic track before the user can retrieve the card from the slot. The new data is either identical to the preceding data, or else it is modified as a function of parameters which depend on the type of verification performed.

Magnetic card access control devices are sometimes not easy to use because of the narrowness of the slot into which the card must be inserted for accurate reading of its contents by appropriate transducers. Thus, when the access control device is used on some kinds of equipment, eg. on ski-lifts at winter sports stations, card handling by users whose hand are full turns out to be particularly slow and inconvenient.

Magnetic cards also have the drawback that the inscription is relatively easy to read fraudulently using suitable equipment for the purpose of illicitly reproducing the inscriptions on blank cards.

Further, the quantity of data stored on the magnetic track is limited by the physical dimensions of the magnetic track (s), by the number of reading or writing transducers, and by their proximity to the magnetic track.

Finally, card reading equipment is expensive and often poorly adapted to severe environmental conditions. In particular, such equipment requires the presence of relatively expensive magnetic transducers together with means for moving the card relative to the transducers or vice versa which render the equipment both complex and liable to breakdown, especially when it has to operate in locations that are poorly protected against bad weather and variations in temperature.

Control devices have also been proposed in which a token can be coupled to a terminal in order to transfer data between the token and a computer in the terminal. The token includes a shift register memory unit from which data may be read during each terminal transaction. After the data has been processed, new data is written into the shift register memory.

In one embodiment of such a system, coupling between the token and the terminal is by induction. In order to avoid fraudulent rewriting of the register, a verification device is provided to compare a card validity check character with an identification character written in a permanent manner on the token. These two data items must be identical before new data can be written into the memory register of a token coupled to a terminal. In order to avoid the fraudulent action of attempting to determine the identification character of a token by employing a large number of successive trials, the number of failed attempts is counted. When this number exceeds a predetermined threshold, the token is invalidated.

However, the same identification character has to be used on a large number of tokens. There is thus a risk that the identification character of these tokens will end up being discovered, thereby opening the door to the fraud of re-writing the token data corresponding, for example, to a number of units of payment greater than the number of units for which the token was acquired.

OBJECTS OF THE INVENTION

An object of the present invention is to improve the security of systems which use verification terminals and portable objects having an electronic memory against non-authorised re-writing of data in the memory on the objects. Another goal of the invention is to provide such an object in an extremely simple manner so as to keep its price down, while enabling it to be used for transactions which require a high level of security against fraud.

SUMMARY OF THE INVENTION

According to one aspect, the invention thus provides a portable object for a verification system, and for example a system for verifying an operation that includes a payment, the object comprising an electronic circuit having at least one shift register memory for storing useful data, which may in particular include an indication of a number of units of payment. The object is equipped with an emitter-receiver device for coupling the object to a terminal equipped with a device of the same type in order to enable data to be interchanged therebetween. Preferably the emitter-receiver system is of the no-contact type suitable for transmitting signals of bits in series corresponding to data read in the register, and of receiving signals of the same type to re-write new useful data into the register. Means for storing check data in said object are provided in association with a device for verifying the concordance between the check data and validity data stored in said object to authorize re-writing useful data. According to the characteristic feature of the invention said validity data is stored in the shift register memory together with the useful data. Preferably it is renewed on each re-write.

By renewing the validity data on each rewrite, it is very difficult for a fraudulent user to discover this data and to send the corresponding check data to the object to authorize re-writing therein. Further, by verifying concordance between the validity data and the check data inside the object, it is possible to avoid the type of fraud which consists in reading a first object to trigger a signal to authorize writing onto a second object which has meanwhile been substituted for the first. In fact, the terminal can proceed to writing only when it receives an authorization from the object on which writing is to take place.

Preferably the validity code or data of the portable object is transmitted to the terminal during reading of the shaft register memory in the object. It is extracted from the total data read by the terminal from the object to be forwarded to a control register thereof in order to verify concordance thereof.

According to an advantageous embodiment, the validity data constitutes a part of the useful data. In this case it is convenient to attribute a certain number of bits in various spaced positions in the shift register in advance to storing validity data. The cells of the shift register corresponding to these bits are connected to the verification device. In one form of implementation, the cabling linking the cells or memory positions in the shift register which contain the validity information to respective inputs of the comparator device is scrambled. Thus, when validity data is compared bit-by-bit with check data, the sequence of the bits thereof is different from the sequence of the validity data. The terminal takes the scrambling into account when producing the check data.

In one embodiment which provides a particularly high degree of security, the verification device is connected by a first link to the cells of the shift register attributed to the validity data and by a second link to cells of the check data storage device, with at least one of said links being provided with a coder for scrambling the correspondance between the order in which the bits of these data items are compared and the order in which they are transmitted serially.

The invention also provides a system for verifying an operation, in particular an operation including payment, the system including a set of portable objects suitable for storing useful data and a verification terminal to which a portable object can be coupled to read the useful data stored therein and to write new useful data after the data has been processed by the terminal. In the system, the verification terminal is suitable for selecting validity data bits from the data transmitted while reading the memory of the portable object, and for generating check data therefrom for retransmission to the portable object, where verification of concordance between the check data and the validity data is necessary to authorise re-writing in the memory of the portable object.

According to a preferred embodiment, the terminal includes processing means suitable for changing the order of validity data read from a portable object in order to extract check data therefrom as a function of a prescribed code.

The invention also provides other embodiments of the verification system described above.

According to one embodiment, the terminal is arranged to permanently transmit interrogation messages suitable for triggering the transmission of data stored in a portable object to the terminal when such an object is presented thereto. Said data is reconverted into electrical signals in the terminal and conveyed to a control unit.

It is a desirable for at least one of the components of the system to emit or to detect transmitted signals only inside a narrow beam in order for the signals exchanged between the terminal and an object presented thereto to be highly localized. This prevents the transmitted signals from disturbing the memories of other portable objects, such as those of adjacent skiers in a line waiting for a ski lift for example, and also makes it difficult for the signals to be detected outside the terminal for fraudulent reproduction thereof.

Various types of signal may be used to implement the invention. For example, infrared waves may be emitted using light emitting diodes. Small hyperfrequency electromagnetic wave emitter-receivers may also be used, as may acoustic signal transducers which may advantageously alternate between emitting and receiving.

Preferably an electronic portable object for a verification system in accordance with the invention includes a power supply for independently powering the circuits in the object.

It is also preferable for a terminal in a verification system in accordance with the invention to include a signal emitter located at the back of a chamber having relatively small lateral dimensions delimited by walls that absorb the emitted energy and having an opening at the opposite end of the chamber to the emitter to allow the emitted energy to escape from the chamber in a relatively narrow beam towards a portable object presented to said opening.

The portable object may advantageously be equipped with a bracelet which a user may attach to the wrist to facilitate presenting the object to the opening of the verification terminal.

For example, in winter sports stations equipped with a system controlling access to ski lifts, such an object may advantageously be issued to each skier at the beginning of a holiday in return for a deposit together with payment of a sum corresponding to a determined number of passes through toll points on the installations and/or to a last use date, said number and/or said last use date being written into the object when it is handed to a skier.

It is easy to present such a portable object to a verification terminal. There is no need to insert the object into a relatively tight space. When acoustic waves are used to interchange signals, there is no need even to remove the object from a holder such as the pocket of a garment to establish contact with the terminal. Cooperation with the terminal can be established through several layers of cloth or the like.

The portable object may be simply constituted, for example using acoustic transducers suitable both for emission and for reception, and being inexpensively embodied in purely static form using current piezo-electric transducers.

BRIEF DESCRIPTION OF THE DRAWING

In the Drawing:

FIG. 3 is a block circuit diagram of an electronic circuit inside the portable object shown in FIG. 1;

SPECIFIC DESCRIPTION

Figure 1:
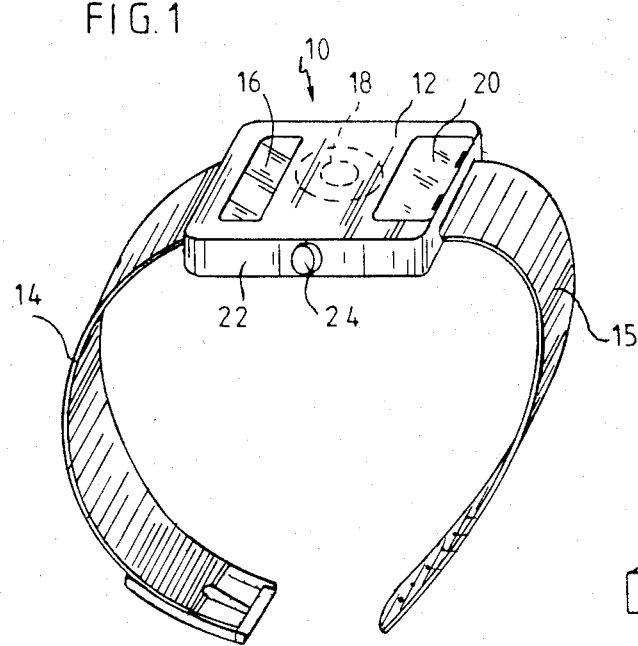
FIG. 1 is a perspective view which shows a portable object in accordance with the invention.

A portable object 10 (FIG. 1) comprises a thin and generally rectangular support 12 of plastic material whose appearance is not unlike that of a watch case, for example. The case 12 has two opposite sides connected to two straps 14 and 15 of a bracelet to enable the user to strap the case 12 to the wrist.

An electronic circuit whose structure is explained with reference to FIG. 3 is received in the material of the case 12, and stores data which is displayed through a window 16 in the top face of the case 12, eg. by means of a liquid crystal display. A piezo-electric crystal is also received in the material of the material of the case 12, and the outline of an active face thereof is shown by a broken line 18 in the middle of the top face of the case 12. The electronic portion of the object 10 comprises C-MOS integrated circuits which are powered by a battery received in a compartment which is accessible via a cover 20 in the top face of the case 12.

A button 24 projects from one of the side faces 22 of the case 12 to control the display of data stored in the object 10 as seen through the window 16.

The piezo-electric crystal outlined in 18 is intended for emitting acoustic waves at an ultrasonic frequency chosen in the range 50 to 150 kHz for example, and over a very small solid angle perpendicular to the top face of the case 12.

Figure 2:
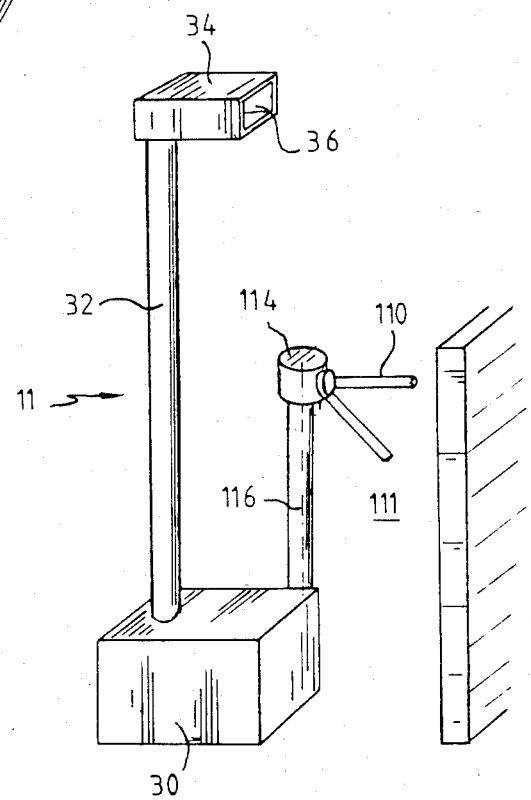
FIG. 2 is a perspective view which shows an access control terminal belonging to a system in accordance with the invention.

A terminal 11 for controlling access (FIG. 2) includes a base 30 for fixing to the ground in an access passage.

Figure 4:
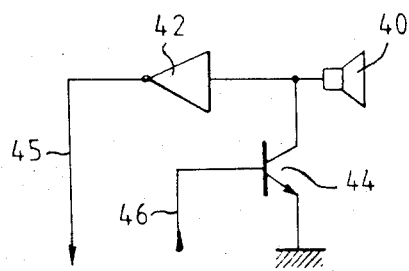
FIG. 4 is a circuit diagram of a part of a circuit equipping the device shown in FIG. 2.

A post 32 stands on the base 30 and is topped by a substantially parallelipiped shaped box 34 with an open front vertical face 36 delimiting a chamber having an acoustic transducer 40 (FIG. 4) located at the back thereof and operating at the above-mentioned selected frequency. The transducer is of the piezo-electric type, low powered, and highly directional. It is made even more directional by virtue of its location at the back of the chamber 34 and by the shape and the internal lining of said chamber. The walls of the chamber absorb waves that strike them, such that practically the only signals to pass through the opening 36 are signals emitted over a small angular apperture. The box is powered by electronic circuits located in the base 30.

The control circuit for the transducer 40 (FIG. 4) comprises an amplifier 42 connected both to the terminals of the crystal 40 and, via a line 45, to a receiver circuit (not shown) in the base 30, and a transistor 44 having its base controlled by a line 46 connected to an emission circuit (not shown), likewise in the base 30 to control the emission of ultrasonic signals by the transducer 40.

The dimensions of the opening 36 in the front face of the box 34 on top of the post 32 may, for example, be about 50 mm×50 mm. The post is chosen to be waist high for a person of average stature, to facilitate anybody wearing a portable object such as the object 10 on the wrist presenting the top face of the case 12 to the front face 36 of the enclosure on the terminal 11. In this position, the acoustic transducers of the object 10 and the terminal 11 can exchange acoustic signals in order to perform an access control operation in accordance with the method described below.

The piezo-electric transducer of the object 10 is shown as 50 on FIG. 3, using a diagrammatic symbol for a loudspeaker. There is no need for it to have similar directional properties to those of the transducer 40. The terminals of the crystal are connected firstly to an emission circuit comprising a transistor 52 whose base is controlled by a coder 54 via an output line 53, and secondly to a receiver circuit comprising an amplifier 55 whose input 57 is connected to the crystal 50.

The piezo-electric crystal 50 is powered by a battery 51 housed in the compartment which is closed by the cover 20, and which serves to supply power to all the active components of the circuit shown in FIG. 3.

A shift register integrated circuit is made in three parts which are shown separately to clarify the description: a shift register 60 comprises between 60 and 2000 cells (60 to 2000 bits corresponding to the data to be stored) connected in series and having an input 62 and a serial output 64 connected both to the coder 54 and to the input 161 of a multiplexer 160; a read shift register 80 connected ahead of the shift register 60; and a write shift register 90 connected ahead of the register 80 by a link 91.

The data stored in the register 60 may be viewed by means of parallel outputs 68 therefrom connected to inputs 70 of the display device 16. The strapping of lines 71 is organized in a theoretically secret manner to determine the correspondance between the output bits from the register 60 and the input bits to the display 16. In other words, provision is made for the data at the outputs 68 from the register 60, eg. concerning a quantity or a limit date for validity, to be encoded in such a manner that when the bits 68 are transmitted to the inputs 70 of the display, the display shows in the clear the data stored in the register 70. The display is powered by a control line 73 via the push button 24.

The input 62 of the register 60 is connected to the output 81 from the register 80 which itself has a series input 84 connected to the series output from the register 90. The input 94 of the register 90 is connected via a multiplexer 160 to receive either the data coming from the register 60 (which is thereby looped on itself via the line 65), or else data coming from a coder 100 whose input is connected by a line 58 to the output from the amplifier 55.

The output 101 from the decoder 100 is also connected to the series input 124 to a shift register 120 whose output is connected to the series input 114 of a second shift register 110. The number of cells in each of the registers 110 and 120 is equivalent to the number of cells in the registers 80 and 90 respectively. The parallel outputs from the registers 110 and 80 are applied to parallel inputs to a comparator 130. The output 131 of the comparator is stored in a memory 151. The output from said memory acts on an internal clock 152 and on a logic AND gate 154. The internal clock 152 is arranged to produce pulses that are applied to the input 171 of a multiplexer 170. The output from the multiplexer is connected to the clock inputs of the three shift registers 60, 80 and 90.

The decoder 100 has a clock output 102 which is connected to the shift clock inputs of the registers 110 and 120, and to the input 172 of the multiplexer 170.

The parallel outputs from the registers 120 and 90 are applied to the parallel inputs of a comparator 140. The output 141 from said comparator is stored in a memory 150. The output from said memory acts on a logic AND gate 154 whose output is applied to inputs 164 and 173 of the multiplexers 160 and 170 respectively to change their state. The clock circuit 152 includes a counter which counts as many pulses as there are cells in the combined shift register 90, 80 and 60 before delivering a signal for resetting the memories 151 and 150 to zero and stopping the emission of pulses.

Figure 5:
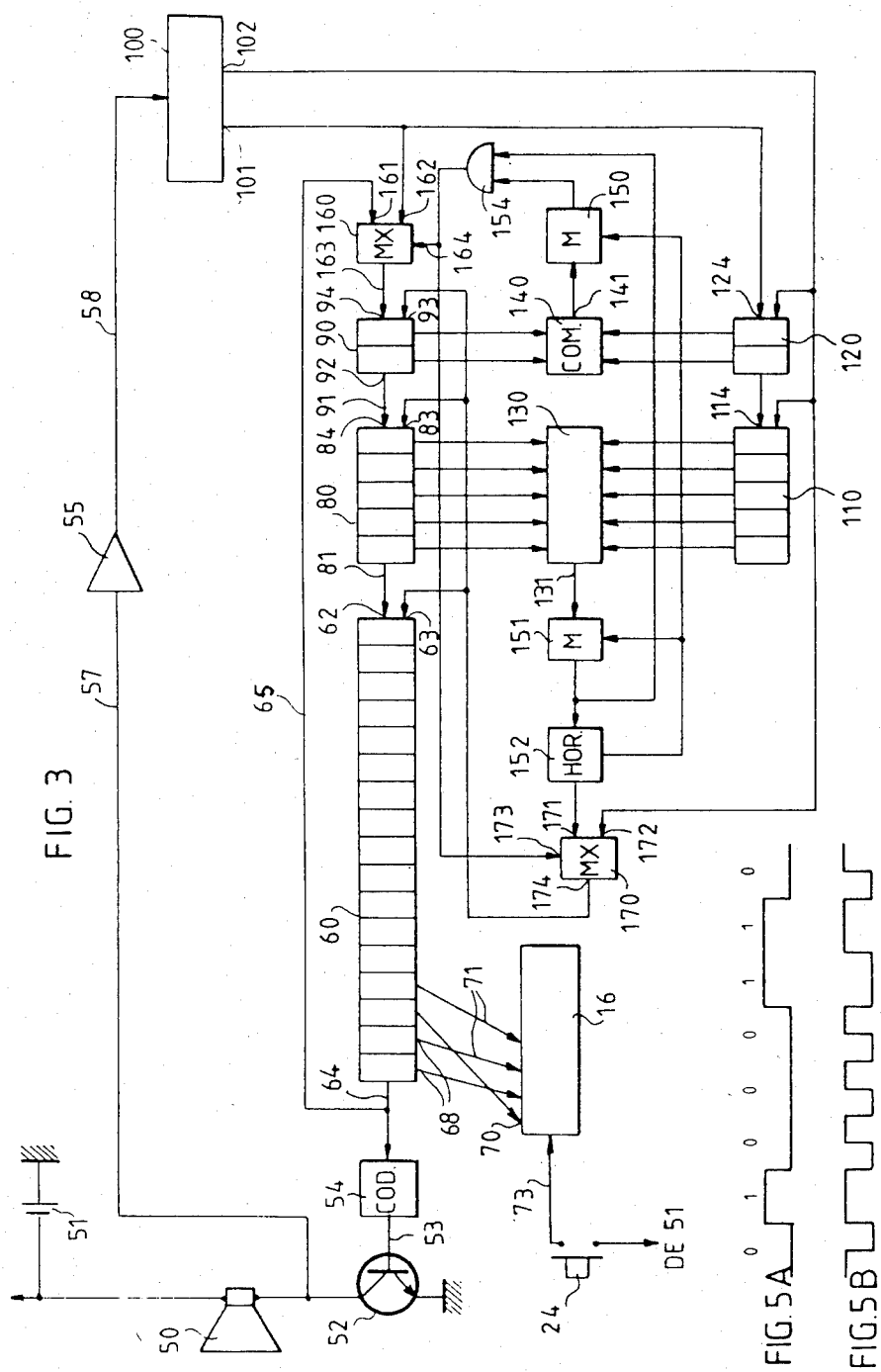
FIGS. 5A and 5B are diagrams of signals of a type that can be used in the invention.

The coder 54 reads the register 60 serially whence it receives NRZ type signals such as those shown in FIG. 5A and converts them into differential bi-phase signals of the type shown in FIG. 5B, for example. In said bi-phase code, each passage from one bit to the next is marked by a transition. Further, zero level bits correspond to twice the transition frequency of one level bits. This type of bi-phase signal is used to excite the transducer 50 and 40, both for emission and for reception.

In the circuit shown in FIG. 3, differential bi-phase signals of the type shown in FIG. 5B as detected by the transducer 50 are decoded by the decoder 100 which produces both NRZ type data signals (FIG. 5A) on an output 101, and clock signals on an output 102.

In operation, the transducer 40 (FIG. 4) of the access control terminal 11 periodically, eg. every 200 milliseconds, emits an interrogation message or sequence of bits. If a portable object 10 has been placed in front of the opening 36, said sequence is detected by the transducer 50 (FIG. 3). The corresponding message appears at the output 85 of the decoder 84 and is stored sequentially in shift registers 120 and 110 under the control of a clock signal, the multiplexers 160 and 170 being set respectively to connect 161 to 163 and 171 to 174. After said storage has finished, the comparator 130 applies a signal on its output 131 if the contents of registers 80 and 110 coincide. Otherwise, the portable object is not read further. This provides a first degree of security against attempts at using non-authorised portable objects with the access system. It should be observed that the order in which the bits are transmitted from one or other of the registers 80 and 110 to the comparator may be modified by suitable strapping so as to encypher the correspondance between the message from the terminal and the contents of the register 80, in the same manner as is described above for the connection between the register 60 and the display 16.

If the comparator 130 applies an enable signal to its output 131, this signal is stored in 151 and the clock circuit 152 then authorises the data in registers 90, 80 and 60 to be read serially and transmitted by the transducer 50 after encoding by the coder 54.

Since the multiplexer 160 is in the position 161 to 163, the data leaving the output of the register 80 serially is thereby automatically re-introduced into the registers 90, 80 and 60.

The data coming from the transducer 50 is detected by the transducer 40 in the access terminal 11 which had returned to a rest condition after emitting its interrogation message. The resulting message is transmitted by the line 45 to the processor located in the base 30 of said terminal. It then verifies the data thus collected.

The access terminal 11 transmits a portable object re-writing message via the emission line 46 connected to the excitation transistor 44 for the transducer 40. After being transmitted as an acoustic signal to the transducer 50, the amplified and decoded message is stored sequentially in the registers 120 and 110 under the control of the clock signal from the decoder (output 102). If the comparison of the message contained in the registers 110 and 80 is correct, and the comparison of the messages in the registers 120 and 90 indicates that the following message is going to be a re-writing message (double checking) the multiplexers 160 and 170 are switched over and the new message is stored in series in the shift registers 90, 80 and 60 until they have been completely filled. In this condition that part of the message which is stored in the cells of the register 60 which are connected to the display 16 correspond to a quantity, eg. the number of points remaining for giving access to ski-lifts in a system where different lifts may require payment of differing numbers of points.

Further data in the register 60 may correspond, for example, to a limit data for which the portable object remains valid.

The data stored in the remainder of the register 60 and in the register 80 may identify the nature of the portable object. The strapping between the comparator 140 and one and/or the other of the registers 90 and 120 may be scrambled in a manner similar to the strapping for the register 80 and/or 110.

When the message that causes re-writing in the registers 60, 80 and 90 is issued, the register 110 is initialised for a read sequence of the portable object which then re-emits the new data stored in the registers 90, 80 and 60, to check conformity of the written data, the multiplexers 160 and 170 being once more in the rest position. If this check is not satisfactory, a new re-writing sequence may be attempted before the barrier is opened. If the check is satisfactory, a pass authorization signal may be delivered by a control line 116 (FIG. 2) to free a turnstile 110 controlling movement through a access passage 112. For this purpose, the turnstile 114 is provided with locking means 114 under the control of the control line 116.

The circuit assembly shown in FIG. 3 is integrated on a chip which is buried in the plastic material of the plate 12 constituting the case 12.

Figure 6:
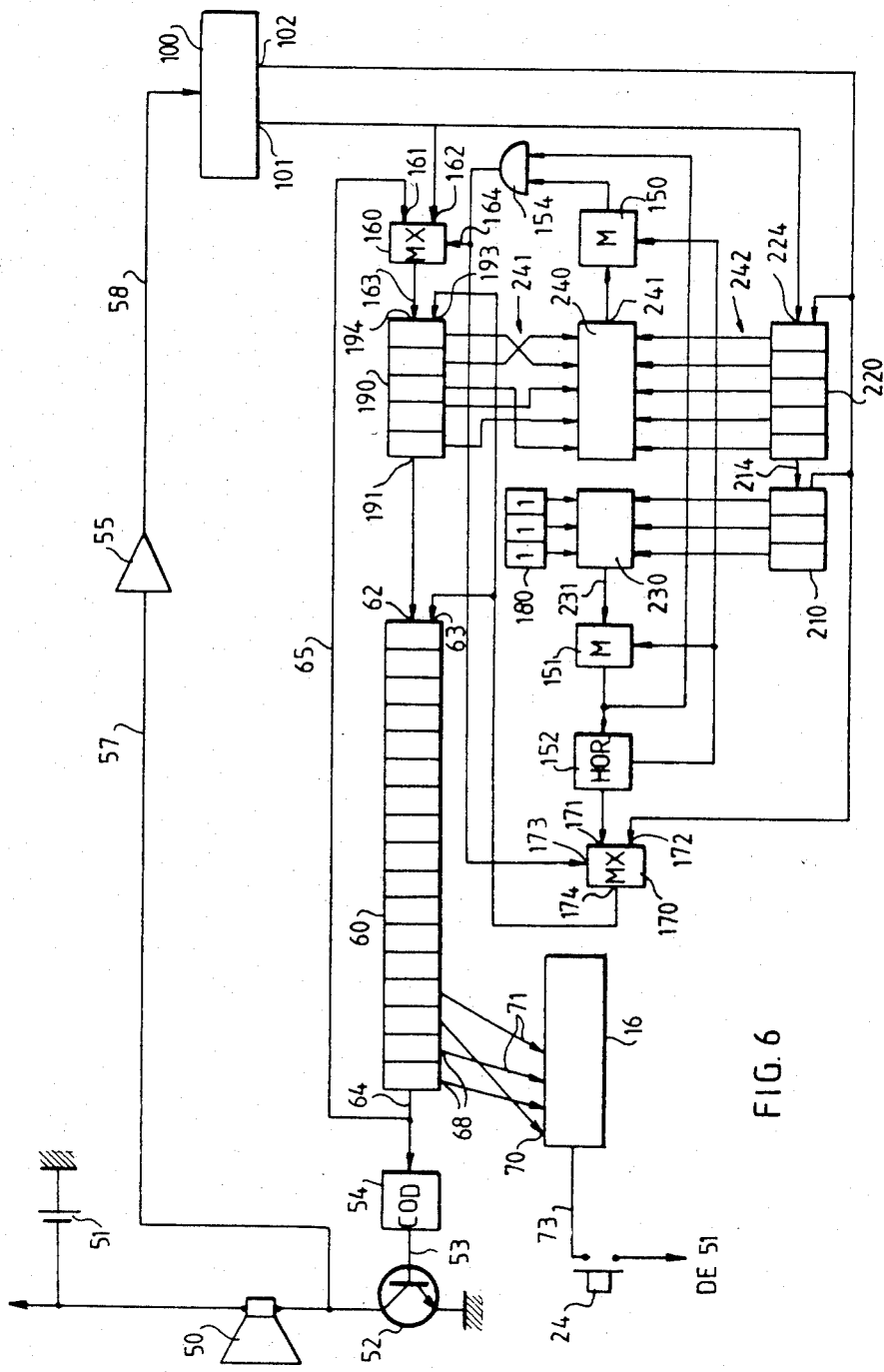
FIG. 6 shows another embodiment of the circuit of FIG. 4.

FIG. 6 shows a variant embodiment of the circuit shown in FIG. 3, which is particularly suited to the case where the initial state of the cells of the shift register 60 is unkown when the portable object is powered up, ie. when the battery 51 is inserted therein. FIG. 6 retains the same reference numerals for identical components. Only the differing components and their functions are described. Instead of a read register such as 80 connected in series with the shift register 60, the portable object of FIG. 6 includes a read register 180 which is constituted by a read only memory applying an unvarying identification code to respective inputs of the read comparator 230. In the example, this code is three level one bits. The read comparator performs bit-by-bit comparison of the contents of said register 180 with the contents of a register 210 which is equivalent to the register 10 of FIG. 3. Its output 231 controls the memory 151.

A write register 190 has a series input 194 connected to the output 163 of the multiplexer 160 and a clock input 193 connected to the output 174 of the multiplexer 170. The series output 191 from the register 190 is connected to the input 62 of the data register 60. Said register 190 comprises 16 cells in this example. The parallel outputs from said cells are connected to parallel inputs of a bit-by-bit comparator 240 by a connection 241 whose strapping is scrambled as shown. Further, the comparator 240 is connected by a second multi-bit connection 242 to the parallel outputs of a shift register 220 having the same function as the FIG. 3 shift register 120 and having a series input 224 connected to the data output 101 of the decoder 100, and a series output connected to the series input 214 of the register 210. The output 241 of the comparator 240 is coupled to the input of the memory 150.

In operation, supposing that the battery 51 has just been inserted or replaced, the contents of the cells in the registers 60 and 190 is random and unkown.

Figure 7:
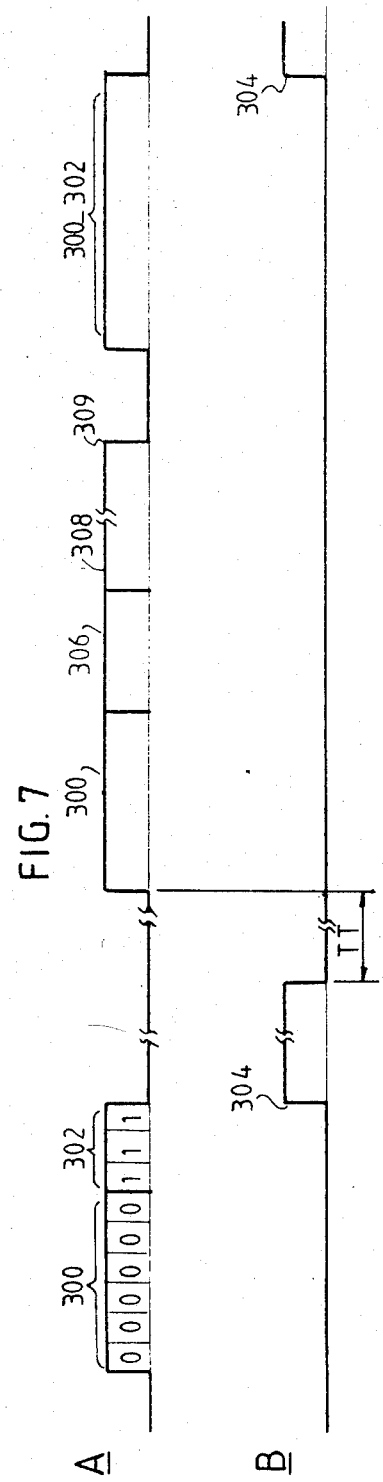
FIG. 7 is a diagram of read and write signals used by the device shown in FIG. 6.

The interrogation signal issued by the terminal (FIG. 7A) is composed of a series of synchronisation bits consituted by zero level bits (series 300) immediately followed by a train of three read bits 302 composed of level one bits. This signal is repeated periodically. When it is detected by the transducer 50 of the FIG. 6 circuit, the read check register 210 is loaded with three level one bits. A co-incidence signal appears at the output of the comparator 230 putting the memory 151 to the one state. As before, the clock 152 is thereby set in motion enabling, via clock inputs 63 and 193, the unkown contents of shift registers 60 and 190 to be read serially. This data is saved by means of the loop 65. The envelope of the read signal is shown diagrammatically in FIG. 7B at 304. It follows the end of the train 302. The end of the read signal 304 is followed by a processing interval TT (FIG. 7B) at the end of which the terminal sends a new synchronising train 300 followed by a train of 16 write code bits 306. This train is composed of bits corresponding to the last 16 bits received by the terminal at the end of read interrogation of the portable object. In theory it thus corresponds to the contents of the write register 190 so long as the scrambling of the strapping of the link 241 is taken into account. The terminal knows about the scrambling code. Consequently the write code 306 is sent to the write check register 220. If this code does, in fact, correspond to the contents of the write register 190, the comparator 240 switches over the memory 150. From then on, the loop 65 is opened as in the FIG. 3 case (multiplexer 160 switching over). The pulse train 308 immediately following the write code 306 is then inserted into the registers 60 and 190 in series. It ends at 309 when the data in these registers has been completely renewed. As before, a new write interrogation signal 300, 302 is sent by the terminal to cause a verification read 304 (FIG. 7B).

The data entered into the register 190 was determined by the terminal. It may correspond to a validity code specially chosen from a large number of possible codes. The validity code may also result from a portion of the data entered in the memory constituted by the registers 60 and 190. During a subsequent read, this data is taken into account by the terminal to form a write check code after verifying that sufficient units of payment remain in the register 60 together with the other validity conditions for the payment represented by the portable object. After verification against the validity code 190, the object will authorise a new message to written. It is thus not possible to use this autohorization to write to another portable object.

Even if the contents of the registers 60 and 190 is read by a possible fraudulent user after discovery of the code in the register 180, it is still extremely difficult for him to discover the key that gives access to rewriting data in the shift register memory.

To simplify the description, the registers 60 and 190 have been shown as being distinct from each other. In practice they may be constituted by a single register. The security of the system may be further improved using a single shift register 365 (FIG. 8) which holds all the data to be stored in the object and which is looped to itself by a loop 165 running from its serial output 164 to its serial input 166 via a multiplexer 260 which is controlled in the same manner as the multiplexer 160 of FIG. 6. The write comparator 240 is replaced by a comparator 340 having inputs 341-1 to 341-n connected to n parallel outputs from various points all along the register 365, as represented by link conductors 342. These conductors may be scrambled by suitable strapping as in the case of the connection 241 of FIG. 6. The comparator performs bit-by-bit comparison of the data present on its inputs 341-1 to 341-n with data present on inputs 343-1 to 343-n coming from a write check register 320 analogous to the register 220 in operation and in connection. The positions of the n cells 300-1, 300-2, 300-n of the register 365 which are connected to the compartor 340 are known to all the terminals of the system. The terminals are thus equipped to sort out data concerning the validity code contained in the register 365 at any given stage in its use from the series of bits acutally received from said register during reading. The validity data is renewed each time re-writing takes place. The bits in cells 300-1, 300-2 to 300-n can naturally form part of the useful data stored in the register 365.

Figure 8:
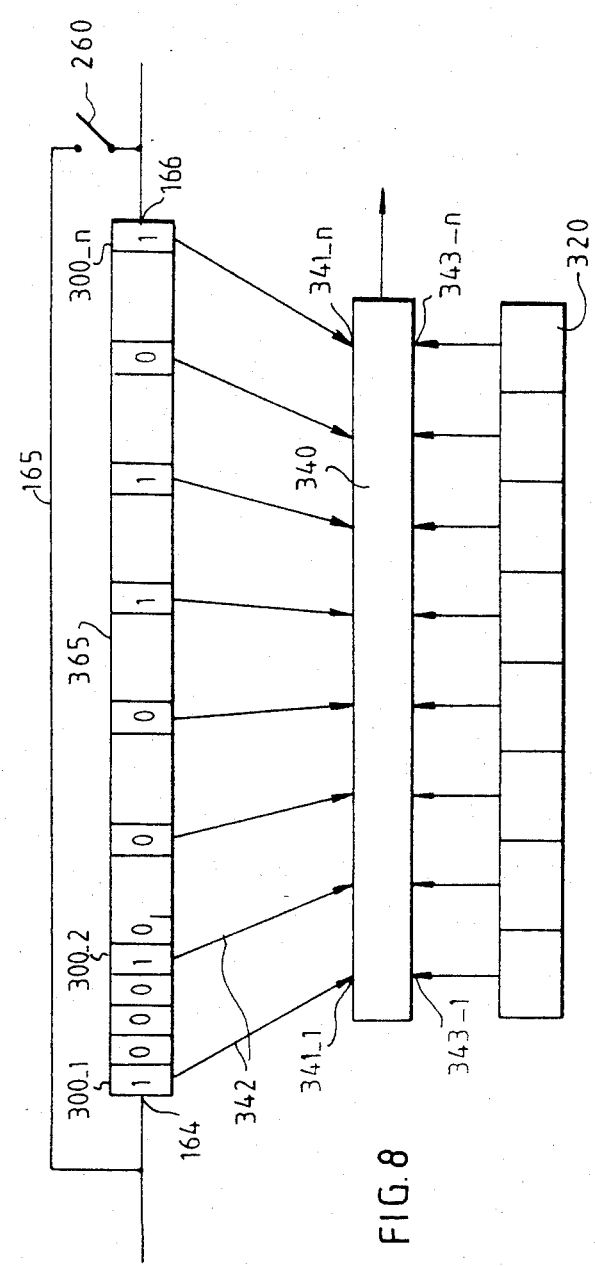
FIGS. 8 to 10 show three embodiments of the shift register memory and its associated concordance verification device in a circuit analogous to that of FIG. 6.
Figure 9:
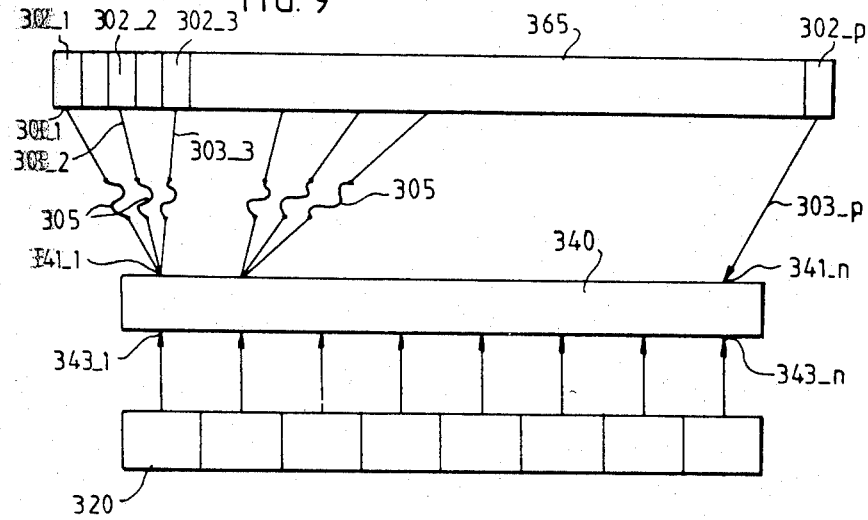

The structure shown in FIG. 8 can be even further improved if, instead of making each of the n inputs 341-1 to 341-n of the comparator 340 correspond to a single cell of the register 365, each is made to correspond to a plurality of cells, eg. three, chosen from the p parallel outputs of the register 365. FIG. 9 shows a single input 341-1 connected to three cells 302-1 to 302-3. The links between said input and the different cells (303-1, 303-2, 303-3) include fuses 305 which may be selectively melted by microprogramming so as to leave only one of the links 303-1 to 303-3 active before the memory portable objects are put into service. Naturally the terminals are adapted as a function of the particular code adopted when melting the fuses 305.

Figure 10:
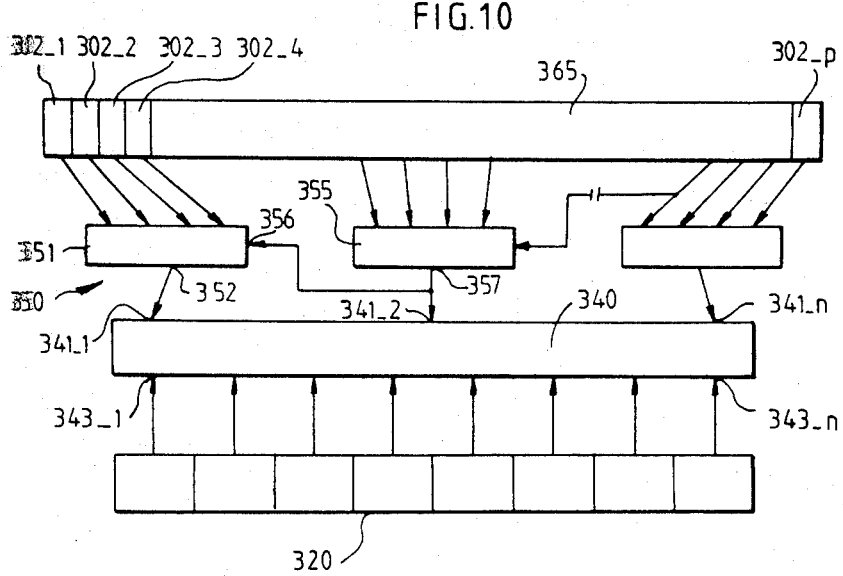

The fuse system shown in FIG. 9 can be replaced with a system 350 employing active coding or multiplexing for establishing a particular correspondance between the contents of the cells 302-1 to 302-p of the register 365 and the combination of signals appearing on the inputs 341-1 to 341-n of the comparator 340. In the case of FIG. 10, for example, a coder 351 has four inputs connected to receive signals corresponding to the contents of the cells 302-1 to 302-4. It has an input 356 on which it receives a signal whose presence or absence modifies the connection between the cells 302-1 to 302-4 and the output 352 of the coder which is connected to the input 341-1. The signal on the input 356 itself depends on the signal from the output 357 of a coder device 355 connecting a plurality of cells in the register 365 to an input 341-2 of the comparator 340. The key to the code applied by the coding circuit such as 350 is known to the reader terminals. It scrambles the correspondance between the different combinations of validity bits which may be written in the register 365 and the check data to be applied by the register 320 to enable re-writing in the register 365 in a manner which is difficult to crack.

It should be observed that an access control system has thus been devised which is particularly simple, does not include any moving parts, is insensitive to magnetic fields, and which is easily protected against external actions.

This system is easy for the users to use, particularly, but not exclusively, in installations where it is used to control access. In particular, it does not require delicate handling of the portable objects used. It thus minimizes time wasting when passing through the control means.

The portable object can be inexpensively embodied since its memory circuit consists essentially of a single shift register which is only used for a serial read and a serial re-write operation each time it is used, said operations taking place under satisfactory conditions of security.

When users carry the objects close to the body, eg. on a bracelet, the electronic circuit is maintained at a substantially constant temperature which further increases its reliability of operation.

The system may be used for applications other than controlling access, for example accounting for units of payment in gambling games or horse races; the process of producing the parts is capable of individualisation by choice of certain parameters (colors) or certain options (automobile construction, for example).

We claim:

1. A portable object for use with an automatic verification system, comprising:

a casing;

an electronic circuit in said casing having at least one shift register memory for storing data including an indication of a number of units of value and quality data;

an emitter-receiver device in said casing capable of non-contacting coupling to a terminal of the verification system for emitting signals of bits in series corresponding to a read of the data in said shift register, and for receiving signals of bits in series to write data in said shift register;

means in said casing for storing check data received from said terminal through said emitter-receiver device;

a device for verifying the concordance between a portion of the received check data and first validity data stored in said object to deliver a read authorization;

means responsive to a read authorization for delivering the data stored in said shift register memory to said emitter-receiver device, for transmission to said terminal, while recirculating the same data through said shift register memory;

a device for verifying the concordance between said check data and second validity data stored in said object and comprising a portion of the data in said shift register memory, to deliver a write authorization, and means responsive to such write authorization for filling said shift register memory with new data received from said terminal, whereby said terminal can change the second validity data upon each rewriting of new data in the portable object, and together with said units of value.

2. The portable object defined in claim 1 wherein the validity data is constituted by bits dispersed among the bits of other data stored in the shift register.

3. The portable object defined in claim 1 wherein the verification device comprises bit-by-bit comparator cells for comparing the validity data and the check data, said cells being connected to corresponding cells in the shift register or the means for storing check data in a different order from the order in which the bits of at least one of these data items is transmitted.

4. The portable object defined in claim 1 wherein the verification device is connected by a first link to cells of the shift register associated with the validity data, and by a second link to cells of check data storage means, one of said links including a coder for scrambling the correspondance between data items.

5. The portable object defined in claim 1, further comprising a storage device for storing check data when reading, and verification means for verifying the concordance between said check data and validity data stored in said shift register.

6. The portable object defined in claim 5, comprising means for providing said re-writing authorization in response both to said read verification means and to said first mentioned concordance verification means.

7. The portable object defined in claim 5 or claim 6, comprising means whereby said read validity data is written in the portable object outside said shift register memory.

* * * * *